United States Patent
Porter

(10) Patent No.: US 6,205,729 B1
(45) Date of Patent: *Mar. 27, 2001

(54) ASYMMETRIC STRUCTURAL INSULATED PANEL

(76) Inventor: William H. Porter, 4240 N. 136th Ave., Holland, MI (US) 49423

( * ) Notice: Subject to any disclaimer, the term of this patent is extended or adjusted under 35 U.S.C. 154(b) by 0 days.

This patent is subject to a terminal disclaimer.

(21) Appl. No.: 09/193,981

(22) Filed: Nov. 18, 1998

(51) Int. Cl.[7] ............................................. E04C 2/296
(52) U.S. Cl. .................... 52/309.7; 52/220.1; 52/309.9; 52/586.1; 52/794.1
(58) Field of Search .............................. 52/220.1, 309.2, 52/309.7, 309.14, 309.16, 585.1, 586.1, 612, 794.1, 801.11

(56) References Cited

U.S. PATENT DOCUMENTS

| | | | |
|---|---|---|---|
| 4,443,988 | * 4/1984 | Coutu, Sr. | 52/309.2 X |
| 4,471,591 | * 9/1984 | Jamison | 52/309.16 X |
| 4,671,038 | * 6/1987 | Porter | 52/586.1 |
| 4,856,244 | * 8/1989 | Clapp | 52/220.1 X |
| 5,081,810 | * 1/1992 | Emmert | 52/794.1 X |
| 5,345,738 | * 9/1994 | Dimakis | 52/309.9 |
| 5,497,589 | * 3/1996 | Porter | 52/794.1 X |
| 5,628,158 | * 5/1997 | Porter | 52/794.1 X |
| 5,638,651 | * 6/1997 | Ford | 52/794.1 X |
| 5,842,314 | * 12/1998 | Porter | 52/309.7 |
| 5,950,389 | * 9/1999 | Porter | 52/586.1 |
| 5,953,883 | * 9/1999 | Ojala | 52/794.1 |

* cited by examiner

*Primary Examiner*—Carl D. Friedman
*Assistant Examiner*—Kevin Wilkens
(74) *Attorney, Agent, or Firm*—Emrich & Dithmar

(57) ABSTRACT

An asymmetric structural insulated panel for building construction includes a generally planar insulating foam core such as of expanded polystyrene, urethane or polyisocyanurate plastic. Adhered to a first surface of the insulating foam core is an outer facing of a conventional building material such as wood, oriented strand board (OSB), gypsum composite or cement. Adhered to a second opposed surface of the insulating foam core by a conventional adhesive is a thin, high strength sheet of paper impregnated with plastic such as polyisocyanurate. The plastic impregnated paper provides a high tensile strength for the structural insulated panel to accommodate large transverse loads on the panel. Elongated "nailing" members may be affixed in a spaced manner to the inner or outer surface of the plastic impregnated paper to also provide this surface of the panel with high compressive strength and to permit the panel to withstand large axial loads. The nailer strips, which may be of wood or metal, also facilitate attaching the structural insulated panel to composite gypsum wallboard, commonly used in conventional building construction.

23 Claims, 6 Drawing Sheets

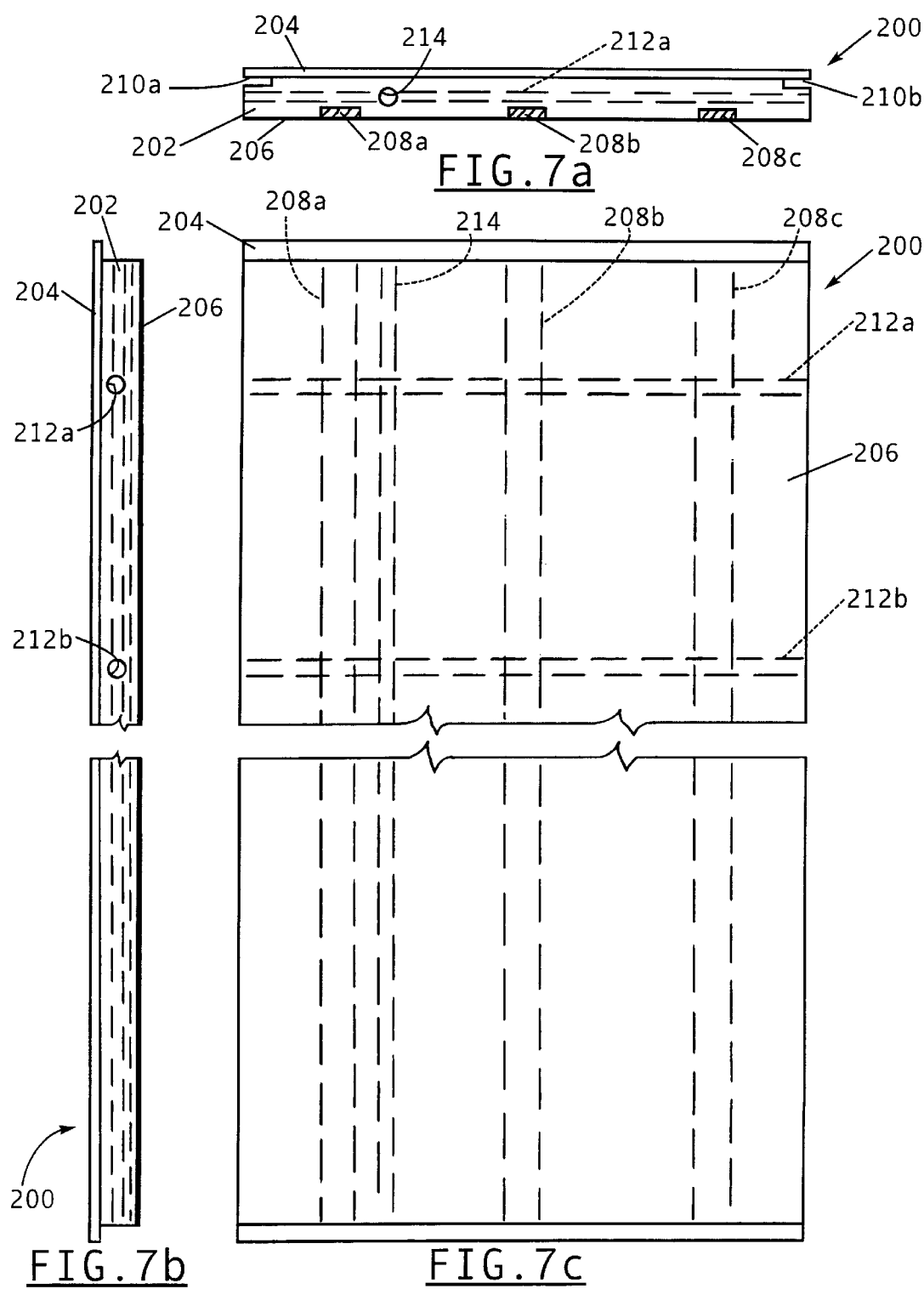

ASYMMETRIC STRUCTURAL INSULATED PANEL

FIELD OF THE INVENTION

This invention relates generally to structural insulated panels for use in building construction and is particularly directed to a structural insulated panel having an inner plastic foam core with a rigid outer facing on one surface thereof and plastic impregnated paper on a second opposed surface of the foam core. In one embodiment, spaced nailers are disposed in contact with the plastic impregnated paper to facilitate attaching the panel to a support member and to increase the panel's compressive strength.

BACKGROUND OF THE INVENTION

Lumber stick construction which employs 2× dimensional structural lumber members and nails is how most houses are constructed. This handcrafted stick built approach is slow and manpower intensive requiring many hours of field work, requires a large supply of a limited natural resource, typically incorporates many thermal bridges in combination with gaps in insulation and thus is not particularly energy efficient, and affords a limited number of structural shapes. An alternative approach employs steel studs. This approach also suffers from limitations in that the steel studs are difficult to work with and are good thermal conductors of heat through walls and roofs.

Another approach gaining increasing acceptance involves the use of Structural Insulated Panels (SIPs). SIP construction typically employs two rigid faces on either side of a light insulating foam core. High strength bonding of the outer facings to the inner core forms a structural I-beam in the form of flat panels which are typically joined together by lumber and nails. The outer, opposed panel faces are generally formed from conventional building materials such as gypsum or cementous composites, plywood, oriented strand board (OSB), drywall, or other rigid construction boards from ¼" to ¾" thick. Several factors have impeded widespread acceptance of SIPs in building construction. For example, the use of SIPs requires a great deal of pre-planning for efficient field erection because these panels are not easily field-cut without the use of special tools. In addition, these panels are generally heavy, weighing much more than conventional wallboard panels, and frequently require the use of special handling equipment such as cranes. Because SIPs are difficult to modify in the field, more precise planning and building techniques are required than the stick built approach of simply working out of a wood pile of 2× dimensional structural lumber members. Finally, current double-faced structural insulated panels are typically 5" thick when installed with drywall. This is wider than typical stick framing of 4-½" thickness and requires special door and window jamb sizes. For these reasons, contractors have not accepted SIPs as a basic structural member in building construction on a widespread scale.

The present invention addresses the aforementioned limitations of the prior art by providing a lightweight, high strength, insulated panel which is easily fabricated, modified and installed.

OBJECTS AND SUMMARY OF THE INVENTION

Accordingly, it is an object of the present invention to provide a lightweight structural insulated panel which is easier to manufacture and adapt for a specific installation in the field than currently available structural insulated panels.

It is another object of the present invention to provide a structural insulated panel capable of withstanding large transverse, axial and racking loads having an outer rigid facing attached to one surface of an inner insulating foam core sheet and an inner facing of a high strength, structural paper attached to a second opposed surface of the foam core sheet.

Yet another object of the present invention is to provide tensile strength in a planar structural insulated panel having a plastic foam core to withstand high transverse loads using a high strength plastic-impregnated paper and high compression strength by means of spaced wood, oriented strand board, composite gypsum, cement or metal strips attached to the inner or outer surface of the sheet of paper.

A further object of the present invention is to provide a lightweight, high strength structural insulated panel having an inner plastic foam core and a single outer rigid facing for use in a wall, ceiling, floor or roof of a building which is easily adapted in the field for and installed in a particular installation.

This invention contemplates a structural insulated panel arrangement comprising a generally flat insulating core; a rigid outer facing attached to a first surface of the insulating core; and a high strength sheet of plastic impregnated paper attached to a second opposed surface of the insulating core for increasing the tensile strength of the panel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1b is an exploded sectional view of the structural insulated panel installation of FIG. 1a;

FIG. 2a is a sectional view of a wall and roof combination incorporating structural insulated panels in accordance with the present invention;

FIG. 2b is an exploded sectional view of the wall and roof combination of FIG. 2a;

FIG. 3b is a partial exploded sectional view of the structural insulated panel wall arrangement of FIG. 3a;

FIGS. 7a, 7b and 7c are respectively top plan, partial side elevation, and partial front views of still another embodiment of a structural insulated panel in accordance with the present invention.

DETAILED DESCRIPTION OF THE PREFERRED EMBODIMENTS

Figure 1A:
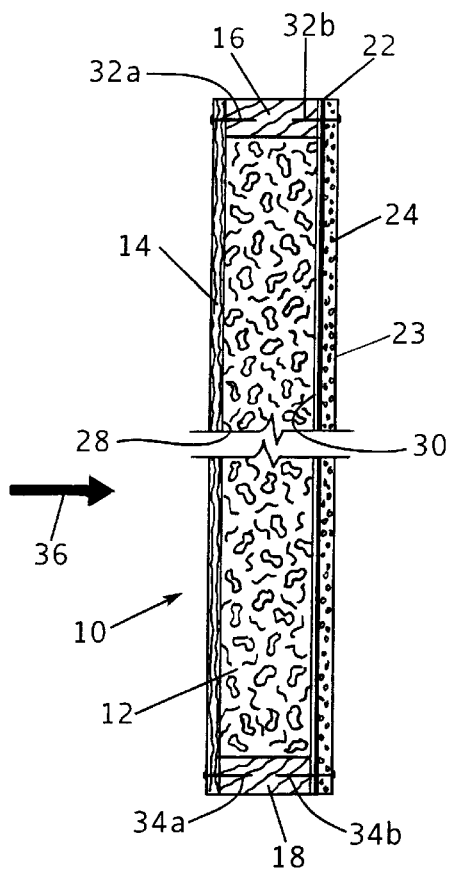
FIG. 1a is a partial sectional view of one embodiment of a structural insulated panel in accordance with the principles of the present invention.
Figure 1B:
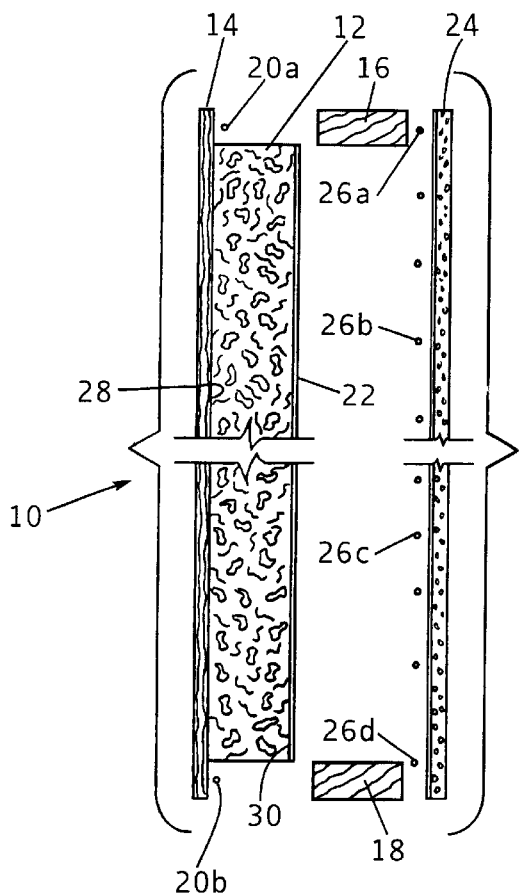

Referring to FIG. 1a, there is shown a partial sectional view of one embodiment of an asymmetric structural insulated panel 10 in accordance with the principles of the present invention. FIG. 1b is an exploded sectional view of the structural insulated panel installation of FIG. 1a. The structural insulated panel 10 includes an inner plastic insulating foam core 12 having a rigid outer facing 14 attached to one surface thereof. Facing 14 may be comprised of a conventional construction material such as metal, oriented strand board (OSB) or plywood and is securely affixed to the surface of the plastic foam core 12 by means of a first adhesive layer 28. Attached to a second opposed surface of the plastic foam core 12 by means of a second adhesive layer 30 is a sheet of plastic impregnated paper 22. The first and second adhesive layers 28, 30 may be comprised of conventional bonding materials such as urethane cement or glue. In a preferred embodiment, the plastic impregnated paper sheet 22 is comprised of paper or box board impregnated with a urethane or polysiocyanurate plastic. In a preferred embodiment, the plastic impregnated paper sheet 22 is comprised of paper or box board impregnated with urethane or polysiocyanurate plastic. The plastic impregnated paper sheet 22 in one embodiment is commercially available from Weyerhauser and is sold under the trade name of P-CELL. The plastic impregnated paper sheet 22 serves as a vapor barrier near the inside of an exterior wall or roof deck to prevent moisture from entering the inside structure or passing through the panel's plastic foam core to the panel's outer facing 14 and wall cladding, if present. The plastic impregnated paper sheet 22 also provides this surface of the structural insulated panel 10 with a high tensile strength as described below.

Disposed respectively on upper and lower ends of the structural insulated panel 10 are upper and lower plates 16 and 18. Each of the upper and lower plates 16,18 is typically comprised of 2× lumber members. In a typical building installation, the structural insulated panel 10 would be attached to the outer surface of a sheet of composite gypsum drywall 24. Beads of mastic 26a, 26b, 26c and 26d are used to securely affix the plastic impregnated paper sheet 22 of structural insulated panel 10 to the outer surface of drywall sheet 24. Affixed to a surface of drywall sheet 24 may be a second plastic impregnated sheet 23 as shown in FIG. 1a to further increase the tensile strength of the structural insulated panel and drywall sheet combination. The upper and lower plates 16,18 are used to securely connect the structural insulated panel 10 to the drywall sheet 24 by means of a couplers 32a, 32b and 34a, 34b. These couplers are typically nails, but may also be screws. The upper and lower plates 16,18 may also be used to securely attach respective upper and lower edges of the structural insulated panel 10 to upper, or ceiling, and lower, or floor, structural members, although this is not shown in the figures for simplicity. The plastic impregnated paper sheet 22 provides high tensile strength for structural panel 10 when a transverse force is applied to the panel in the direction of arrow 36 shown in FIG. 1a. The specified plastic impregnated sheet 22 0.015" in thickness possesses a tensile strength approximately equal to that of 0.4375" OSB (across the grain). This high strength of the plastic impregnated paper sheet 22 in combination with its relatively low cost of $0.07/square foot (OSB cost is approximately $0.29/square foot) makes the use of this paper particularly attractive when used in a structural insulated panel. The structural insulated panel is also much lighter and easier to handle and conform in the field to a specific installation than a double-faces structural insulated panel. Structural panel 10 thus provides a high strength panel having a single outer face which is lighter, and easier to manufacture, modify and install than prior art double faced structural insulated panels.

Figures 2A, 2B:
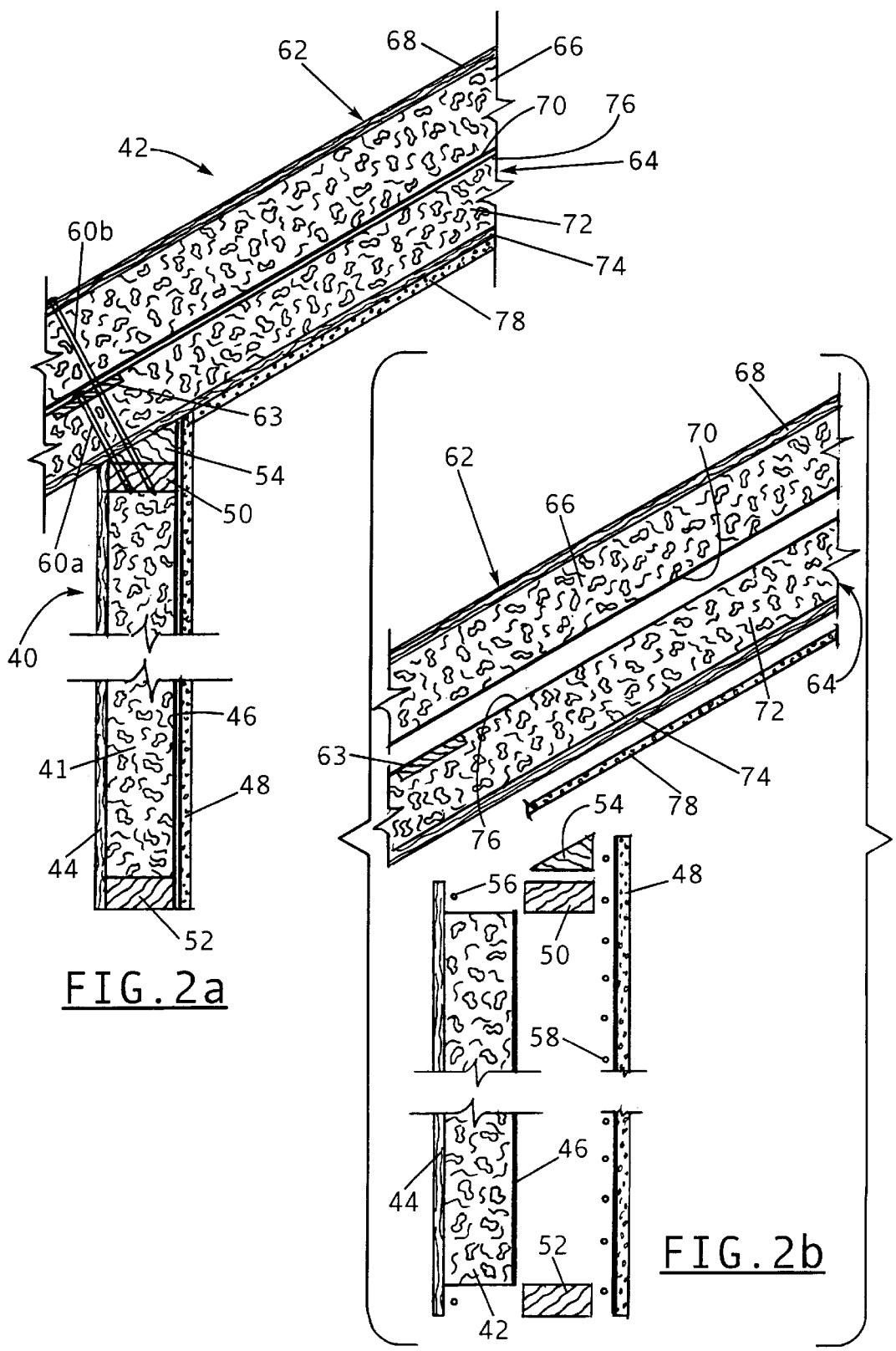

Referring to FIG. 2a, there is shown a partial sectional view of a combination wall panel 40 and roof panels 42 in accordance with the present invention. FIG. 2b is an exploded sectional view of the connected wall and roof panels 40,42 shown in FIG. 2a. Wall panel 40 is similar in construction to the wall panel shown in FIGS. 1a and 1b and includes an inner plastic foam insulating core 42, a rigid outer facing 44 on a first surface of the foam core, and a plastic impregnated paper sheet 46 on a second, opposed outer surface of the foam core. The structural insulated wall panel 40 is attached to a sheet of drywall 48 by means of upper and lower plates 50 and 52 as well as by a plurality of nails or screws as shown in FIG. 2a. Upper plate 50 in combination with a triangular spacer plate 54 is also used to securely connect an upper end of the structural insulated wall panel 40 with the roof panels 42 as described below. The upper and lower plates 50, 52 as well as spacer plate 54 are to preferably comprised of wood.

Roof panels 42 include a first upper roof panel 62 and a second lower roof panel 64. The first roof panel 62 includes an inner foam core 66, a rigid outer facing 68 disposed on a first surface of the foam core, and a plastic impregnated paper sheet 70 attached to the second, opposed surface of the foam core. As described above, the rigid outer facing 68 and plastic impregnated sheet 46 are affixed to opposed surfaces of the panel's insulating foam core 66 by conventional means such as urethane cement or glue. The plastic insulating foam core 66 is preferably comprised of expanded polystyrene or urethane. The second inner roof panel 64 is similarly comprised of an inner plastic insulating foam core 72, a rigid outer facing 74 attached to a first surface of the panel's foam core, and a plastic impregnated paper sheet 76 attached to a second opposed surface of the panel's inner foam core. The roof panels 42 are positioned on a sheet of wall board 78 and are attached to the upper end of the structural insulated wall panel 40 by means of first and second coupling screws 60a and 60b. Screw 60b is inserted through the rigid outer facings 68 and 74 of the first and second roof panels 62, 64, while screw 60a is inserted through rigid outer facing 74. The ends of the first and second screws 60a, 60b are further inserted into the triangular spacer plate 54 and the wall's upper plate 50 as shown in FIG. 2a. Disposed within the second roof panel 64 between the panel's plastic insulated paper sheet 76 and inner foam core 72 is a nailer strip 63. The first and second screws 60a, 60b are further inserted through nailer strip 63, with the first screw 60a engaging the nailer strip for securely attaching the second roof panel 64 to the upper edge of the structural insulated wall panel 40. Nailer strip 63 may be comprised of a conventional building material such as wood or OSB and is bonded to the panel's foam core 72 by a conventional adhesive such as mastic. The adjacent plastic impregnated paper sheets 70 and 75 provide the pair of roof panels 42 with a high tensile strength with respect to both upwardly and downwardly directed forces applied to the roof panels.

Figure 3B:
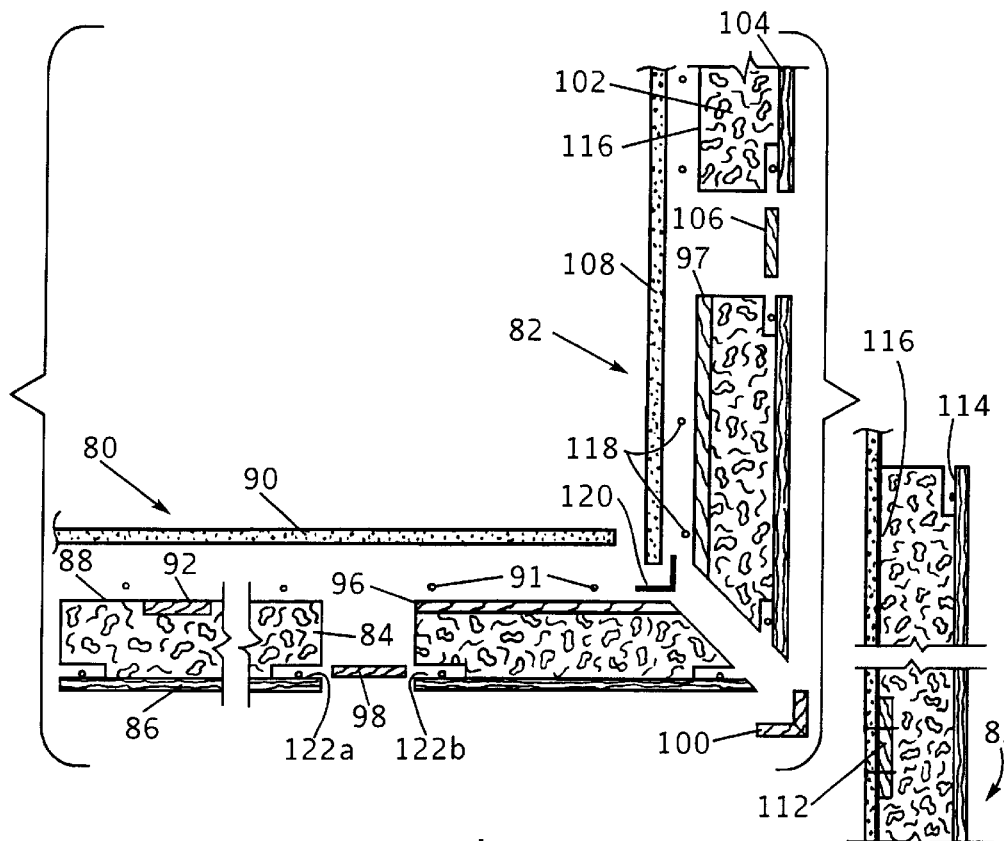
Figure 3A:
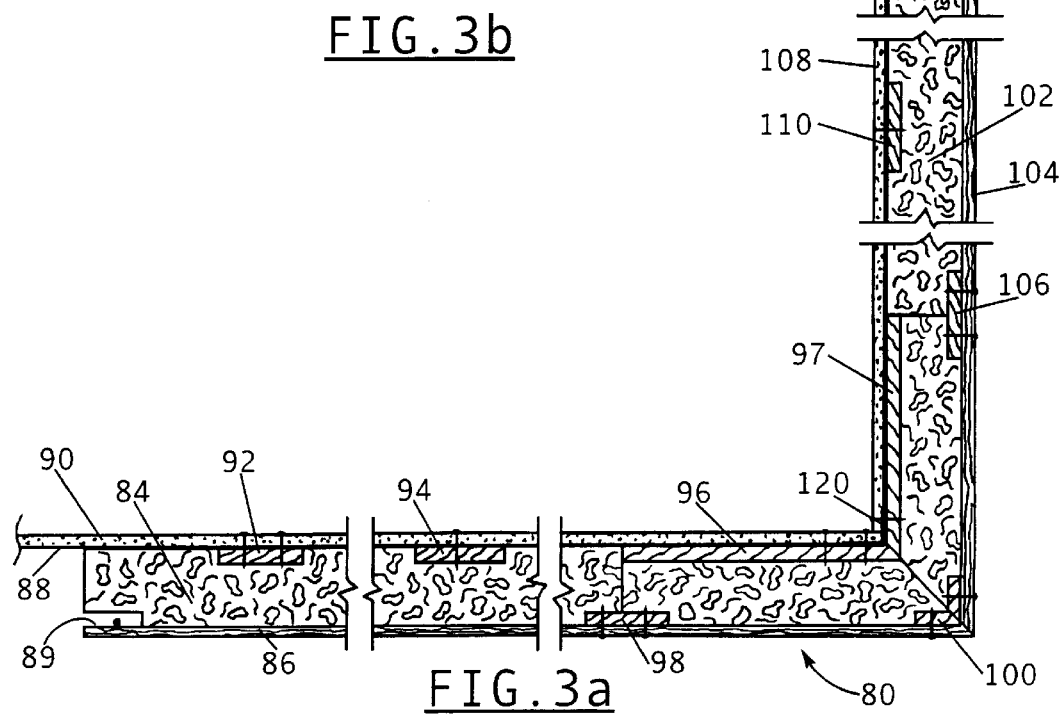
FIG. 3a is a partial sectional view of a pair of connected wall sections incorporating structural insulated panels in accordance with the present invention.

Referring to FIG. 3a, there is shown a partial sectional view of a pair of connected wall sections each incorporating structural insulated panels in accordance with the present invention. FIG. 3b is a partial exploded sectional view of the structural insulated panel wall arrangement of FIG. 3a. The first wall section includes a first wall panel 80 having an inner insulating foam core 84, a rigid outer facing 86 attached a first surface of the foam core, and a plastic impregnated paper sheet 88 attached to a second opposed surface of the panel's foam core. The first wall panel 80 is shown as including two sections each having a respective edge slot 122a and 122b. Edge slots 122a, 122b are each adapted to receive a coupling spline 98 for securely connecting the two wall sections. Beads of mastic are shown deposited in the first and second slots 122a, 122b for bonding the coupling spline 98 to adjacent sections of the panel's outer facing 86 and foam core 84 in connecting the two wall sections. Also disposed within the first wall panel 80 are first and second nailer strips 92 and 94 and a first inner corner nailer 96. The first and second nailer strips 92, 94 allow the first wall panel 80 to be securely attached to an inner gypsum drywall sheet 90 by conventional couplers such as nails or screws as shown in FIG. 3a Beads of mastic 91 are also used to securely attach the first wall panel's plastic impregnated paper sheet 88 to the gypsum drywall sheet 90. The nailer strips as well as the coupling spline 98 may be comprised of conventional building materials such as wood or OSB.

A second wall panel 82 is similarly comprised of an inner foam core 102, a rigid outer facing 104 attached to one surface of the foam core, and a plastic impregnated paper sheet 116 attached to a second opposed surface of the foam core. The second wall panel 82 is also comprised of a pair of wall sections connected by means of a coupling spline 106 inserted in facing slots in the two wall panel sections. The second wall panel 82 is attached to a drywall sheet 108 by means of beads of mastic 118 as well as by means of nails or screws used with nailers as in the case of the first wall panel 80, where a second inner corner nailer 97 is shown in the figures.

Each of the first and second wall panels 80,82 includes a beveled edge where the two panels are joined to form a 90° angle. A 90° outer corner nailer 100 comprised of OSB laminated to a sheet metal spline is inserted in opposed slots in the bevelled edges of the first and second wall panels 80, 82. The outer corner nailer 100 is securely maintained in the aligned facing slots in the adjoining edges of the first and second wall panels 80,82 by means of mastic beads disposed within the slots. An inner sheet metal corner reinforcing angle 120 is placed in contact with the inner surfaces of the first and second inner corner nailers 96,97 of the first and second wall panels 80,82. Nails or screws are inserted through the drywall sheets 90 and 108, as well as through the sheet metal corner reinforcing angle 120 and the first and second inner corner nailers 96,97 for securely connecting the inner edges of the first and second wall panels 80, 82. Similarly, nails or screws are inserted through the rigid outer facings 86 and 104 of the first and second wall panels 80,82 as well as through the outer corner nailer 100 for securely connecting the outer edges of the two wall panels. The plastic impregnated paper sheets 88 and 116 provide the first and second wall panels 80,82 with substantial tensile strength to withstand a large transverse force applied to the outer facings of these panels. The various nailer strips and the inner corner nailers 96,97 facilitate attaching the first and second wall panels 80,82 to drywall sheets 90 and 108 using either nails or screws. The nailer strips also provide the inner surface portions of the two wall panels with the capacity to withstand a large transverse force as well as the ability to accommodate large axial (along the length of the panel) and racking (along the width of the panel) loads. Bonding between the wall panels and the drywall sheets is further enhanced by mastic beads disposed between these structural members. In this as well as in the other embodiments described herein, the plastic impregnated paper sheet may be affixed to a sheet of drywall to which the structural insulated panel is attached rather than to the panel's insulating foam core to provide the panel with the increased strength described above. The rigid outer facings as well as the various nailers in the embodiment shown in FIGS. 3a and 3b, as well as in the various other embodiments described herein, may be comprised of common building materials such as metal, wood, oriented strand board, composite gypsum or cement.

Figure 4:
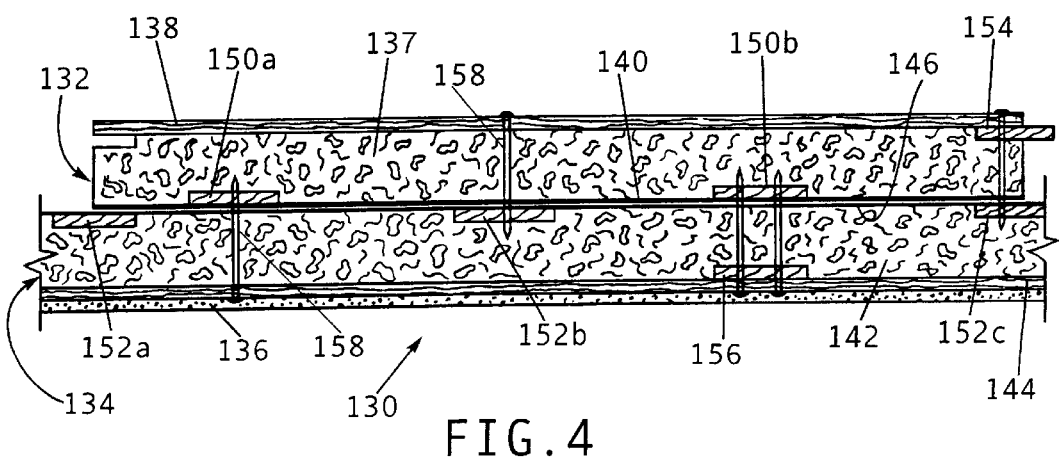
FIG. 4 is a sectional view showing additional details of a structural member such as a wall, roof, ceiling, or floor incorporating a pair of connected structural insulated panels in accordance with another embodiment of the present invention.

Referring to FIG. 4, there is shown a sectional view illustrating additional details of a horizontal roof section 130 incorporating an upper roof panel 132 and a lower roof panel 134 in accordance with another embodiment of the present invention. Although the structural member shown in FIG. 4 is described as a horizontal roof section, the structural member shown therein may also form a wall, a ceiling, or a floor in a building. As in the previously described embodiments, the upper roof panel 132 includes an inner insulating foam core 137, an outer facing 138 attached to an upper surface of the foam core, and a plastic impregnated paper sheet 140 attached to the opposed, lower surface of the panel's foam core. Similarly, the lower roof panel 134 includes an insulating foam core 142, a rigid outer facing 144 attached to a lower surface of the foam core, and a plastic impregnated paper sheet 146 attached to an opposed, upper surface of the panel's foam core. Disposed within the upper roof panel 132 in a spaced manner are nailers 150a and 150b. Disposed within the lower roof panel 134 in a spaced manner are a second plurality of nailers 152a, 152b and 152c. Each of the nailers is disposed within the insulating foam core of its associated panel adjacent the panel's plastic impregnated paper sheet and is adapted to receive either a nail or a screw inserted through the outer facing of the other panel for securely joining the upper and lower roof panels 132, 134. Each of the upper and lower roof panels 132, 134 is comprised of at least a pair of joined roof sections each having slots in their opposed surfaces for receiving a coupling spline. Thus, coupling spline 156 is inserted in adjacent sections of the lower roof panel 134 for securely connecting the two lower roof sections, while coupling spline 154 connects adjacent sections of the upper roof panel 132. As shown in FIG. 4, nails or screws 158 are inserted through each of the coupling splines in one of the roof panels as well as through a nailer in the other roof panel for securely connecting the upper and lower roof panels. A drywall sheet 136 is shown attached to the lower surface of the lower roof panel 134 by conventional means such as beads of mastic which are not shown for simplicity.

Figure 5A:
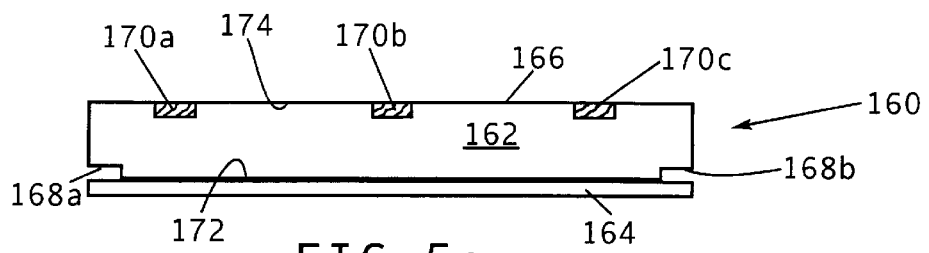
FIGS. 5a, 5b and 5c are respectively top, front planar and side elevations views shown partially in phantom of another embodiment of a structural insulated panel in accordance with the present invention.
Figure 5B:
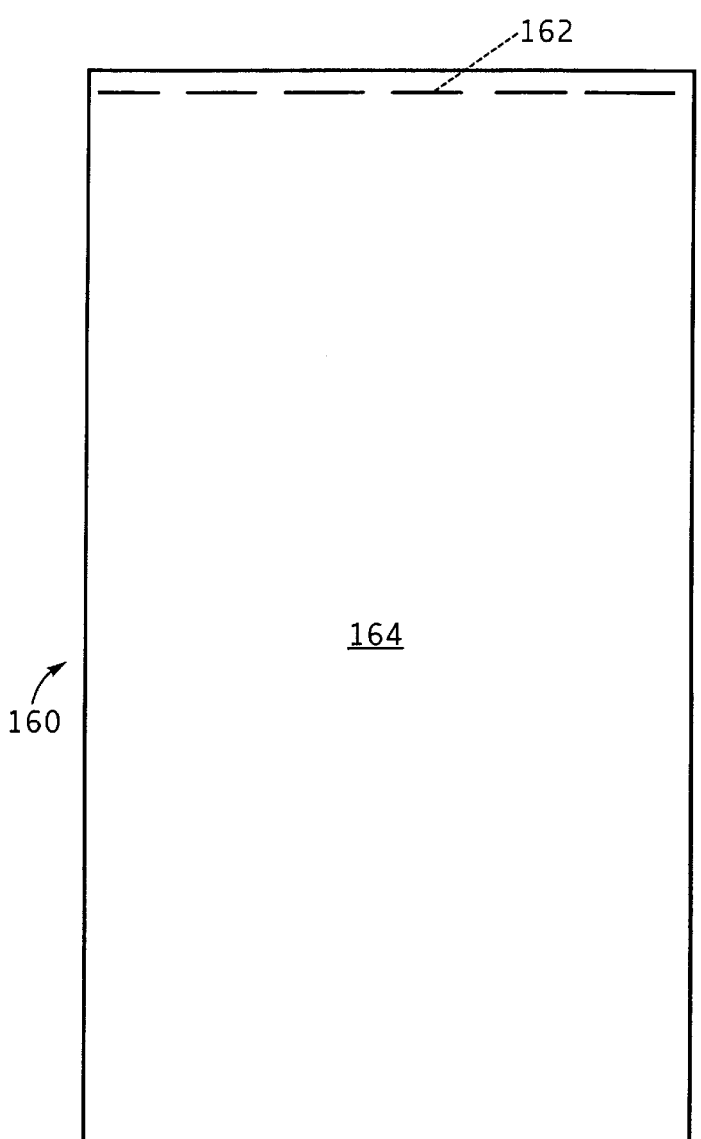
Figure 5C:
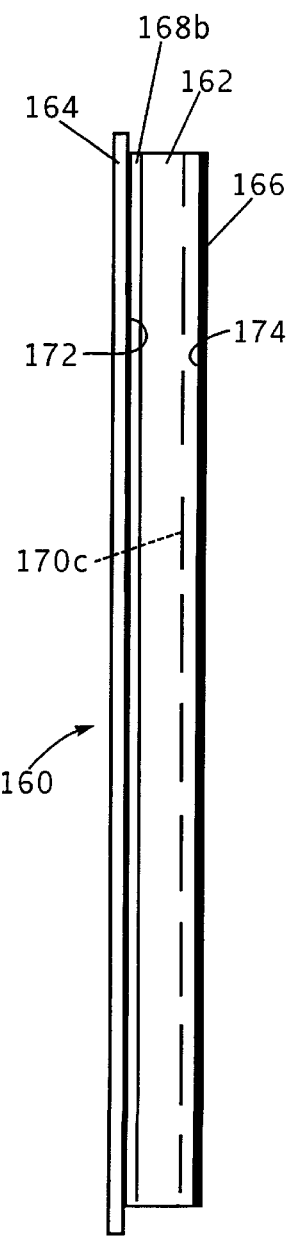

Referring to FIGS. 5a, 5b, and 5c, there are respectively shown top plan, front elevation and side elevation views shown partially in phantom of a structural insulated panel 160 in accordance with another embodiment of the present invention. Structural insulated panel 160 includes an inner insulating foam core 162, a rigid outer facing 164 disposed on one surface of the foam core, and a plastic impregnated paper sheet 166 attached to a second opposed surface of the panel's foam core. As in the previously described embodiments, opposed edges of the structural insulated panel 160 are provided with coupling slots 168a and 168b each running the length of the panel which are adapted to receive respective coupling splines (not shown for simplicity) as described above. First and second adhesive layers 172 and 174 respectively couple the rigid outer facing 164 and the plastic impregnated paper sheet 166 to opposed surfaces of the panel's insulating foam core 162. Disposed within the foam core 162 in a spaced manner are first, second and third internal nailers 170a, 170b and 170c. Beads of mastic may be used to securely attach each of the internal nailers 170a, 170b and 170c to the panel's insulating foam core 162. Each of the internal nailers 170a, 170b and 170c facilitates attaching the to structural insulated panel 160 to a support structure such as a sheet of drywall and increases the compressive strength of the panel as previously described. Nails or screws inserted through the aforementioned support structure (which is not shown in the figures for simplicity) and into the internal nailers provide secure coupling between the structural insulated panel 160 and the support structure.

Figure 6A:
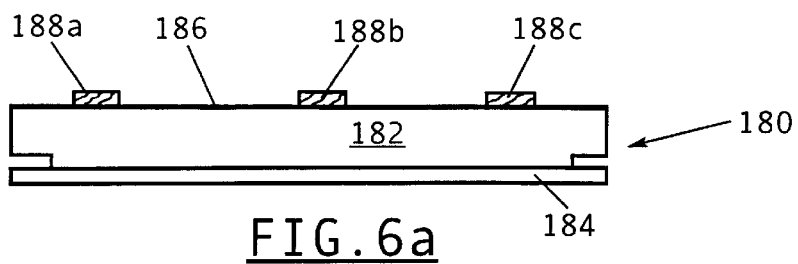
FIGS. 6a, 6b and 6c are respectively top, front plan and side elevation views of a structural insulated panel in accordance with yet another embodiment of the present invention.
Figure 6B:
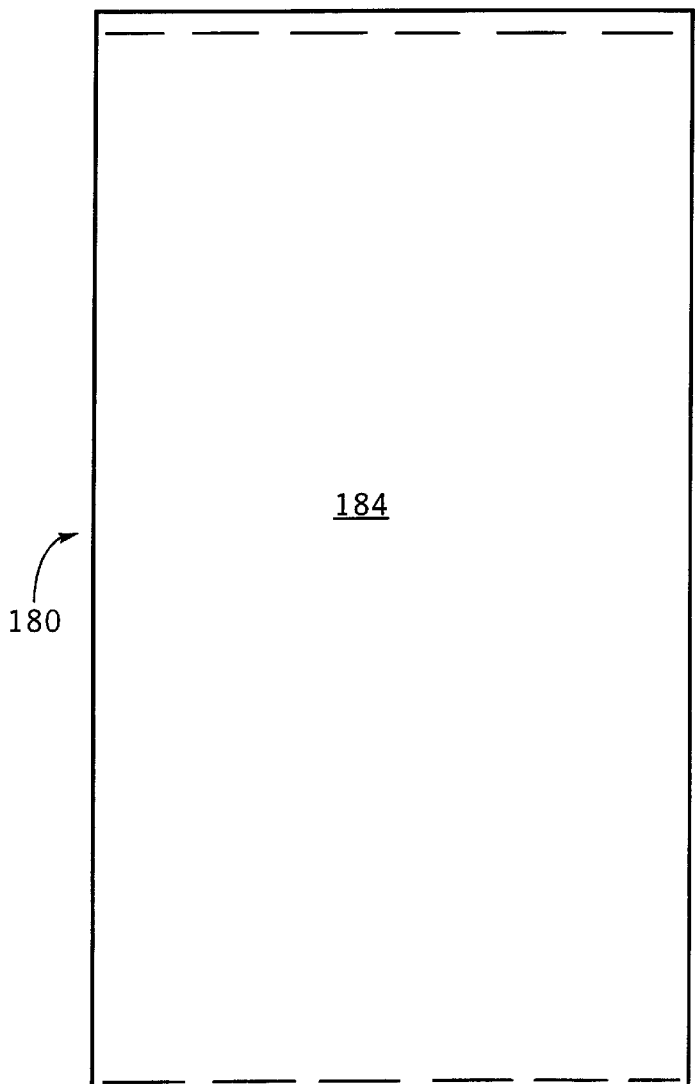
Figure 6C:
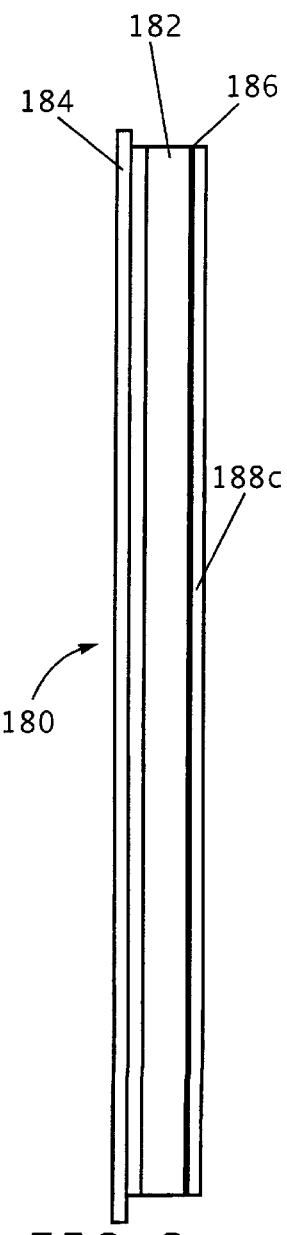

Referring to FIGS. 6a, 6b and 6c, there are respectively shown top plan, front elevation and side elevation views of yet another embodiment of a structural insulated panel 180 in accordance with the present invention. As in the previously described embodiment, the structural insulated panel 180 includes an inner foam core 182, a rigid outer facing 184 attached one surface of the front core, and a plastic impregnated paper sheet 186 attached to a second opposed surface of the panel's foam core. In the embodiment shown in FIGS. 6a 6b, and 6c, three external nailers 188a, 188b and 188c are attached to the outer surface of the panel's plastic impregnated paper sheet 186 by conventional means such as beads of mastic. As in the previously described embodiments, external nailers 188a, 188b and 188c facilitate attachment of the structural insulated panel 180 to a structural support member such as a sheet of drywall (not shown in the figures for simplicity) and substantially increase the panel's compressive strength.

Referring to FIGS. 7a, 7b and 7c there are respectively shown top plan, partial side elevation, and partial front views of still another embodiment of a structural insulated panel 200 in accordance with the present invention. FIGS. 7a, 7b and 7c are shown partially in phantom to illustrate additional details of this embodiment of the invention. The structural insulated panel 200 includes an inner insulating foam core 202, a rigid outer facing 204 affixed to one surface of the foam core, and a plastic impregnated paper sheet 206 affixed to a second, opposed surface of the panel's foam core. Conventional adhesives are used to bond the rigid outer facing 204 and the plastic impregnated paper sheet 206 to opposed surfaces of the panel's insulating foam core 202. Disposed in a spaced manner within an outer surface of the panel's foam core 202 are first, second and third internal nailers 208a, 208b and 208c in the form of elongated, linear strips of metal, wood or OSB. A conventional bonding agent such as mastic is used to affix each of the first, second and third internal nailers 208a, 208b and 208c to the panel's foam core 202 as well as to the plastic impregnated paper sheet 206. Coupling slots 210a and 210b in opposed edges of the insulating foam core 202 allow the structural insulated panel 200 to be securely connected to adjacent similar structural insulated panels by means of connecting splines as described above. Disposed within the foam core 202 and extending the width of the structural insulated panel 200 are first and second horizontal electrical chases 212a and 212b. Also disposed within the foam core 202 and extending the length of the panel 200 is a vertical electrical chase 214 which intersects each of the first and second horizontal electrical chases 212a and 212b. In a preferred embodiment, the panel's insulating foam core 202 is comprised of expanded polystyrene, urethane or polysiocyanurate foam, while a preferred bonding agent is Morton 640 series adhesive. The panel's external rigid outer facing 204 and each of the internal nailers 208a, 208b and 208c are preferably comprised of OSB.

There has thus been shown an asymmetric structural insulated panel for building construction which includes an insulating foam core, a rigid outer facing affixed to one surface of the foam core, and a plastic impregnated paper sheet attached to a second, opposed surface of the panel's foam core. The plastic impregnated paper provides a high tensile strength for the structural insulated panel to accommodate large transverse loads applied to the panel. The plastic impregnated paper sheet may also be bonded to a sheet of drywall to which the panel is attached rather than to the panel's insulating foam core to provide the panel with increased strength. The insulating foam core is comprised of a plastic such as expanded polystyrene, urethane or polysiocyanurate, while the rigid outer facing is comprised of oriented strand board or plywood. Elongated nailers also comprised of OSB or wood are disposed in a spaced manner within the panel's insulating foam core and in contact with the plastic impregnated paper sheet to provide the paper coated surface of the panel with high compressive strength to withstand large axial or racking loads.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. An asymmetric structural insulated panel arrangement comprising:

a generally flat insulating core;

a rigid outer facing attached to a first surface of the insulating core;

a high strength sheet of plastic impregnated paper attached to a second opposed surface of said insulating core for increasing the tensile strength of the panel;

plural rigid structural members arranged in a spaced manner and disposed either on the outer surface of said plastic impregnated paper sheet or within the second surface of said insulating core and in contact with said plastic impregnated paper sheet for increasing the compression strength of the panel; and adhesive means for securely affixing said rigid structural members to the outer surface of said plastic impregnated paper sheet or to said insulating core and said plastic impregnated paper sheet.

2. The structural insulated panel arrangement of claim 1 wherein said adhesive means comprises urethane cement or glue.

3. The structural insulated panel arrangement of claim 1 wherein said rigid structural members are comprised of metal, wood, oriented strand board, composite gypsum or cement.

4. The structural insulated panel arrangement of claim 1 wherein said rigid outer facing is comprised of oriented strand board, plywood, gypsum composite or cement.

5. The structural insulated panel arrangement of claim 1 wherein said insulating core is comprised of expanded polystyrene, urethane or polyisocyanurate plastic foam.

6. The structural insulated panel arrangement of claim 1 wherein said sheet of paper is impregnated with urethane or polyisocyanurate plastic.

7. The structural insulated panel arrangement of claim 1 further comprising an electrical chase disposed within said insulating core.

8. The structural insulated panel arrangement of claim 1 further comprising a support member and coupling means inserted in said rigid structural members for connecting the structural insulated panel to said support member.

9. The structural insulated panel arrangement of claim 8 wherein said support member comprises a sheet of composite gypsum drywall.

10. The structural insulated panel arrangement of claim 9 further comprising a second plastic impregnated paper sheet affixed to a surface of said sheet of composite gypsum drywall.

11. The structural insulated panel arrangement of claim 9 wherein said coupling means includes nails or screws.

12. The structural insulated panel arrangement of claim 1 further comprising a plurality of plate means each disposed on a respective edge of said structural insulated panel for attaching said structural insulated panel to a support member.

13. The structural insulated panel arrangement of claim 12 wherein said plurality of plate means includes an upper plate and a lower plate respectively disposed on upper and lower edges of said structural insulated panel, wherein each of said upper and lower plates is disposed in contact with said insulating core and between said rigid outer facing and said sheet of plastic impregnated paper.

14. The structural insulated panel arrangement of claim 13 wherein said upper and lower plates are comprised of wood.

15. A structural insulated panel arrangement comprising:
a first structural insulated panel having a first generally flat insulating core, a first rigid outer facing attached to a first surface of said first insulating core, and a first high strength sheet of plastic impregnated paper attached to a second opposed surface of said first insulating core;
a second structural insulated panel having a second generally flat insulating core, a second rigid outer facing attached to a first surface of said second insulating core, and a second high strength sheet of plastic impregnated paper attached to a second opposed surface of said second insulating core;
first and second nailers respectively disposed in said first and second panels; and
coupling means inserted through said first rigid facing and through said second nailer and through said second rigid facing and said first nailer for connecting said first and second panels, wherein said first and second rigid facings form respective opposed outer surfaces of said panel arrangement and said first and second sheets of plastic impregnated paper are disposed in abutting contact within said panel arrangement.

16. The structural insulated panel arrangement of claim 15 wherein said first and second nailers are comprised of metal, wood, oriented strand board, gypsum composite or cement.

17. The structural insulated panel arrangement of claim 16 wherein said coupling means includes nails or screws inserted through said rigid facings and said nailers.

18. The structural insulated panel arrangement of claim 17 further comprising adhesive means for securely attaching said first nailer to said first insulating core and said first sheet of plastic impregnated paper and for securely attaching said second nailer to said second insulating core and said second sheet of plastic impregnated paper.

19. The structural insulated panel arrangement of claim 18 wherein said first and second rigid outer facings are comprised of wood, oriented strand board, gypsum composite or cement.

20. The structural insulated panel arrangement of claim 19 wherein said sheet of paper is impregnated with urethane or polyisocyanurate plastic.

21. The structural insulated panel arrangement of claim 20 further comprising a sheet of gypsum drywall attached to one of said rigid outer facings.

22. The structural insulated panel arrangement of claim 21 wherein opposed edges of said first and second insulating cores each include respective slots therein, said structural insulated panel arrangement further comprising splines inserted in said slots for connecting said first and second structural insulated panels to other structural insulated panels.

23. The structural insulated panel arrangement of claim 22 wherein said nails or screws are inserted through said first or second rigid facings and through one of said splines.

* * * * *

UNITED STATES PATENT AND TRADEMARK OFFICE
CERTIFICATE OF CORRECTION

PATENT NO.   : 6,205,729 B1
DATED        : March 27, 2001
INVENTOR(S)  : William H. Porter It is certified that error appears in the above-identified patent and that said Letters Patent is hereby corrected as shown below:

<u>Title page,</u>
Item [76] should read:
-- [76] Inventor: William H. Porter, P.O. Box 249, Saugatuck, MI (US) 49453 --

Signed and Sealed this

Sixteenth Day of October, 2001

Attest:

*Nicholas P. Godici*

NICHOLAS P. GODICI
*Attesting Officer*   *Acting Director of the United States Patent and Trademark Office*